INVENTORS.
FRED H. OSBORNE.
CHARLES J. HULL.
BY
Lockwood, Galt, Woodard & Smith,
ATTORNEYS.

June 23, 1959 C. J. HULL ET AL 2,891,797

AUTOMATIC PHONOGRAPH

Filed July 6, 1953 12 Sheets-Sheet 2

INVENTORS.
FRED H. OSBORNE.
CHARLES J. HULL.
BY
Lockwood, Galt, Woodard & Smith.
ATTORNEYS.

June 23, 1959 C. J. HULL ET AL 2,891,797

AUTOMATIC PHONOGRAPH

Filed July 6, 1953 12 Sheets-Sheet 3

INVENTORS.
FRED H. OSBORNE.
CHARLES J. HULL.

BY Lockwood, Galt, Woodard & Smith
ATTORNEYS.

INVENTORS.
FRED H. OSBORNE.
CHARLES J. HULL.
BY
Lockwood, Galt, Woodard & Smith
ATTORNEYS INVENTORS.
FRED H. OSBORNE.
CHARLES J. HULL.
BY
Lockwood, Galt, Woodard & Smith,
ATTORNEYS.

INVENTORS.
FRED H. OSBORNE.
CHARLES J. HULL.
BY
Lockwood, Galt, Woodard & Smith.
ATTORNEYS.

INVENTORS.
FRED H. OSBORNE.
CHARLES J. HULL.
BY
Lockwood, Galt, Woodard & Smith,
ATTORNEYS.

INVENTORS.
FRED H. OSBORNE.
CHARLES J. HULL.
BY
Lockwood, Galt, Woodard & Smith
ATTORNEYS.

June 23, 1959 C. J. HULL ET AL 2,891,797

AUTOMATIC PHONOGRAPH

Filed July 6, 1953 12 Sheets-Sheet 9

INVENTORS.
FRED H. OSBORNE.
CHARLES J. HULL.
BY
Lockwood, Galt, Woodard & Smith.
ATTORNEYS.

INVENTORS.
FRED H. OSBORNE.
CHARLES J. HULL.
BY
Lockwood, Galt, Woodard & Smith.
ATTORNEYS.

INVENTORS.
FRED H. OSBORNE
CHARLES J. HULL.
BY
Lockwood, Galt, Woodard & Smith,
ATTORNEYS.

INVENTORS.
FRED H. OSBORNE.
CHARLES J. HULL.
BY
Lockwood, Galt, Woodard & Smith,
ATTORNEYS.

2,891,797
Patented June 23, 1959

2,891,797

AUTOMATIC PHONOGRAPH

Charles J. Hull, Eggertsville, and Fred H. Osborne, Snyder, N.Y., assignors to The Rudolph Wurlitzer Company, Chicago, Ill., a corporation Application July 6, 1953, Serial No. 366,284
23 Claims. (Cl. 274—10)

This invention relates to an automatic phonograph of the selective type adapted to reproduce a selected side of a selected record, or one side of a group of records in sequence followed by the reproduction of the other side thereof in sequence.

It is the object of this invention to provide a record changer of the above type for automatically changing and reproducing the relatively thin flexible "Vinylite" records, as distinguished from the thicker, heavier and more rigid type of shellac composition records.

One feature of the invention resides in the provision of an elevator type record magazine movable to selective positions vertically of the turntable and provided with a series of vertically spaced shelves providing horizontal compartments for receiving the individual records, together with automatically controlled means for raising and lowering the magazine to bring a selected record into the plane of the turntable for transfer thereto.

Another feature of the invention resides in the record transfer mechanism operable in timed relation with the positioning of the selected record for slidably moving the record from its supporting shelf and compartment onto the turntable in position to be centered thereon.

A further feature of the invention resides in mechanism operable in timed relation with the record transfer mechanism to center the record on the turntable and clamp it thereto for securing it during the reproduction to prevent wobble and cocking due to its light and flexible character.

The invention also contemplates provision for the reproduction of a selected side of the record when clamped upon the turntable controlled by the direction of travel of the magazine and operable through a slight raising or lowering of the turntable. Thus, depending upon the upward or downward movement of the magazine, the turntable may be raised to bring the upper side of the record into playing engagement with the upper tone arm and rotate it in the proper direction for reproduction, or lowered to bring the lower side of the record into reproducing engagement with the lower tone arm and rotate it in the reverse direction.

Still a further feature of the invention resides in the turntable drive including a fly wheel of heavy mass carried by the turntable spindle to impart constant speed of rotation to the record, which fly wheel carries spaced radially extending flanges embracing a motor driven wheel for selective engagement therewith to drive the turntable in a direction to reproduce the upper side of the record when the lower flange of the fly wheel is raised into engagement with the driving wheel, and in the opposite direction to reproduce the lower side of the record when lowered to bring the upper flange into engagement with the driving wheel.

Other features of the invention have to do with the conditioning of the control mechanism for accomplishing the above, and the lifting and sliding of the record from the turntable back to the magazine, as will be hereinafter more specifically set forth and described.

The full nature of the invention will be understood from the accompanying drawings and the following description and claims.

Figure 1:
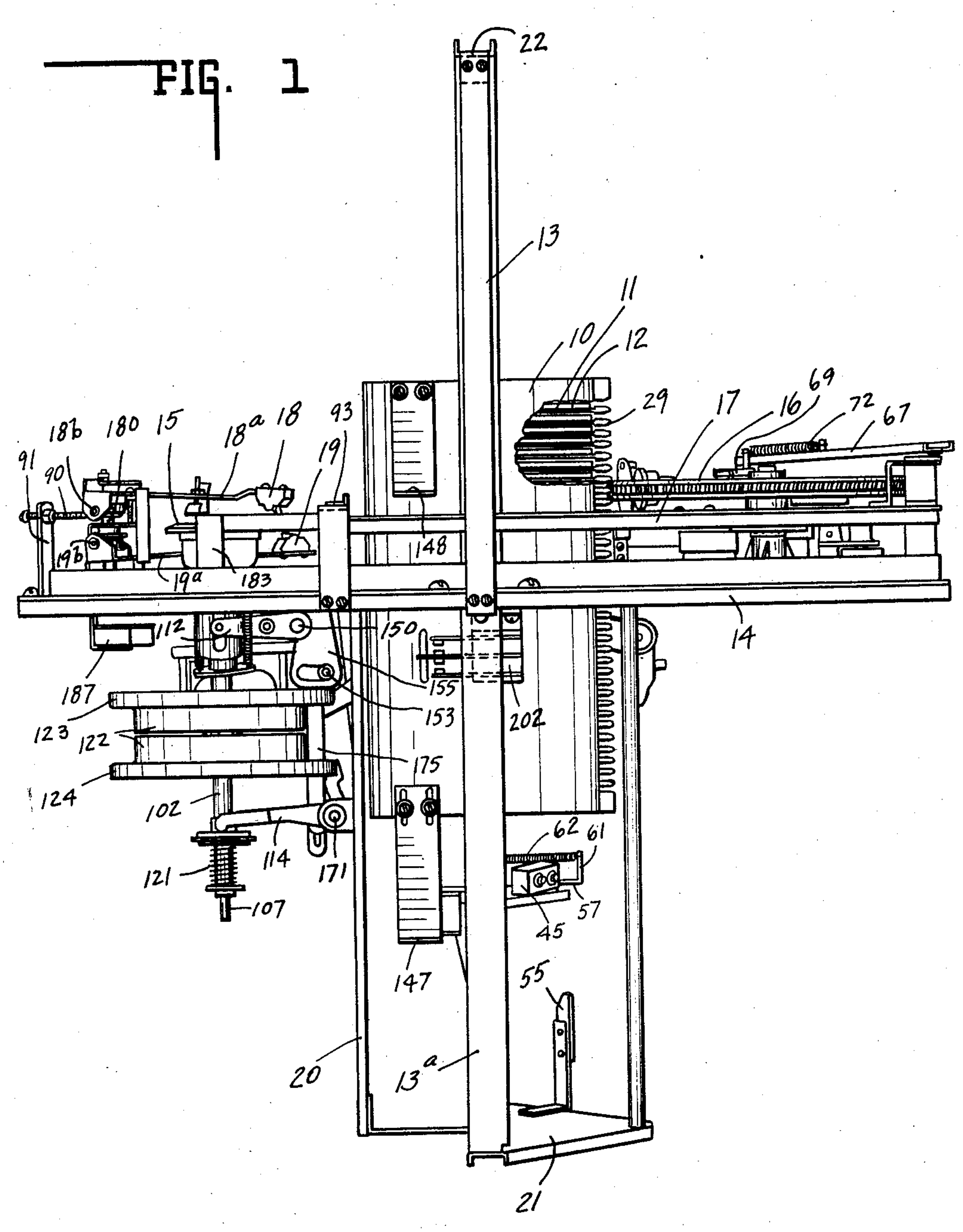
Fig. 1 is a side elevation of the record changer with parts broken away and omitted for clearness.
Figure 2:
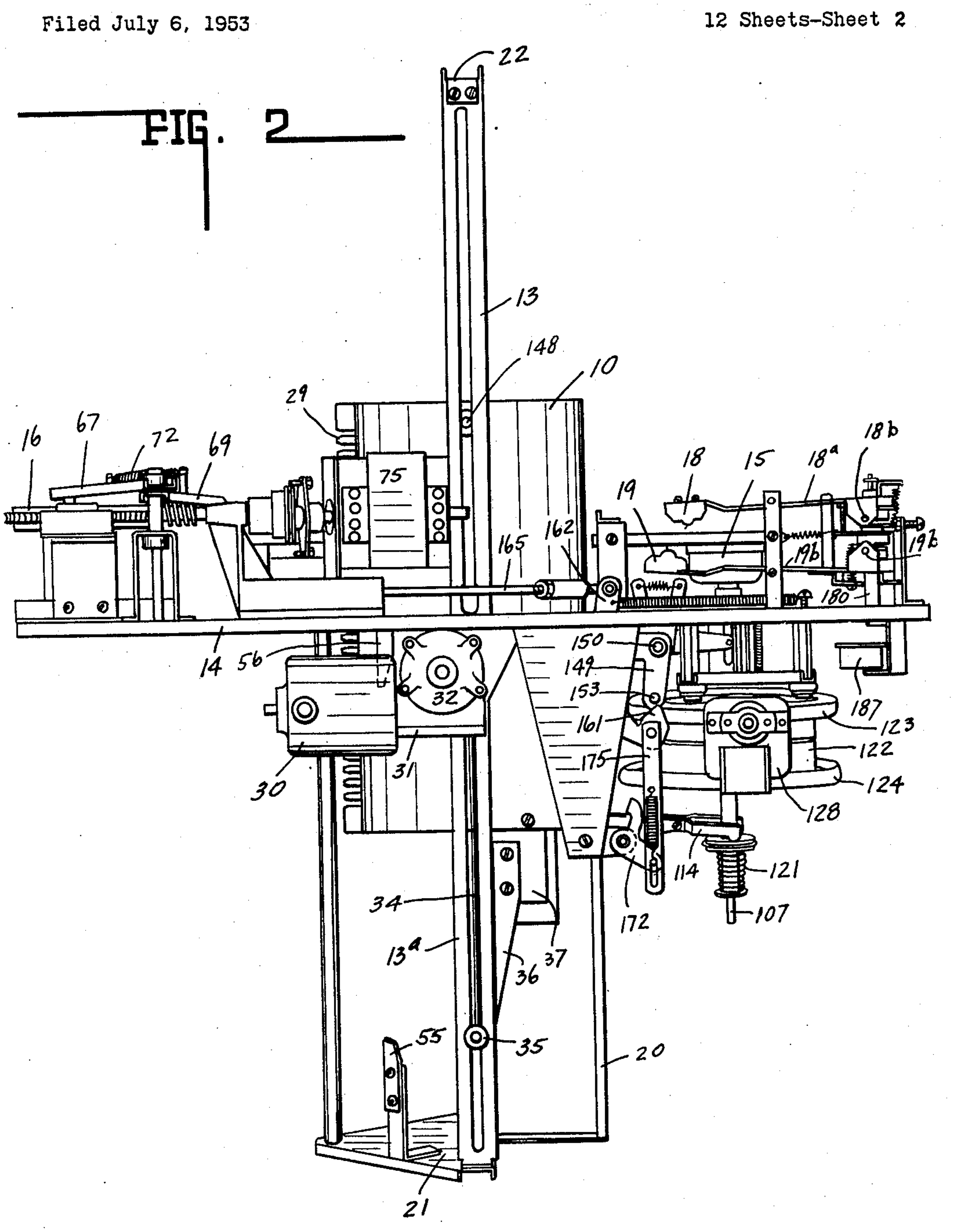
Fig. 2 is the same as Fig. 1, showing the opposite side elevation thereof with parts omitted for clearness.
Figure 3:
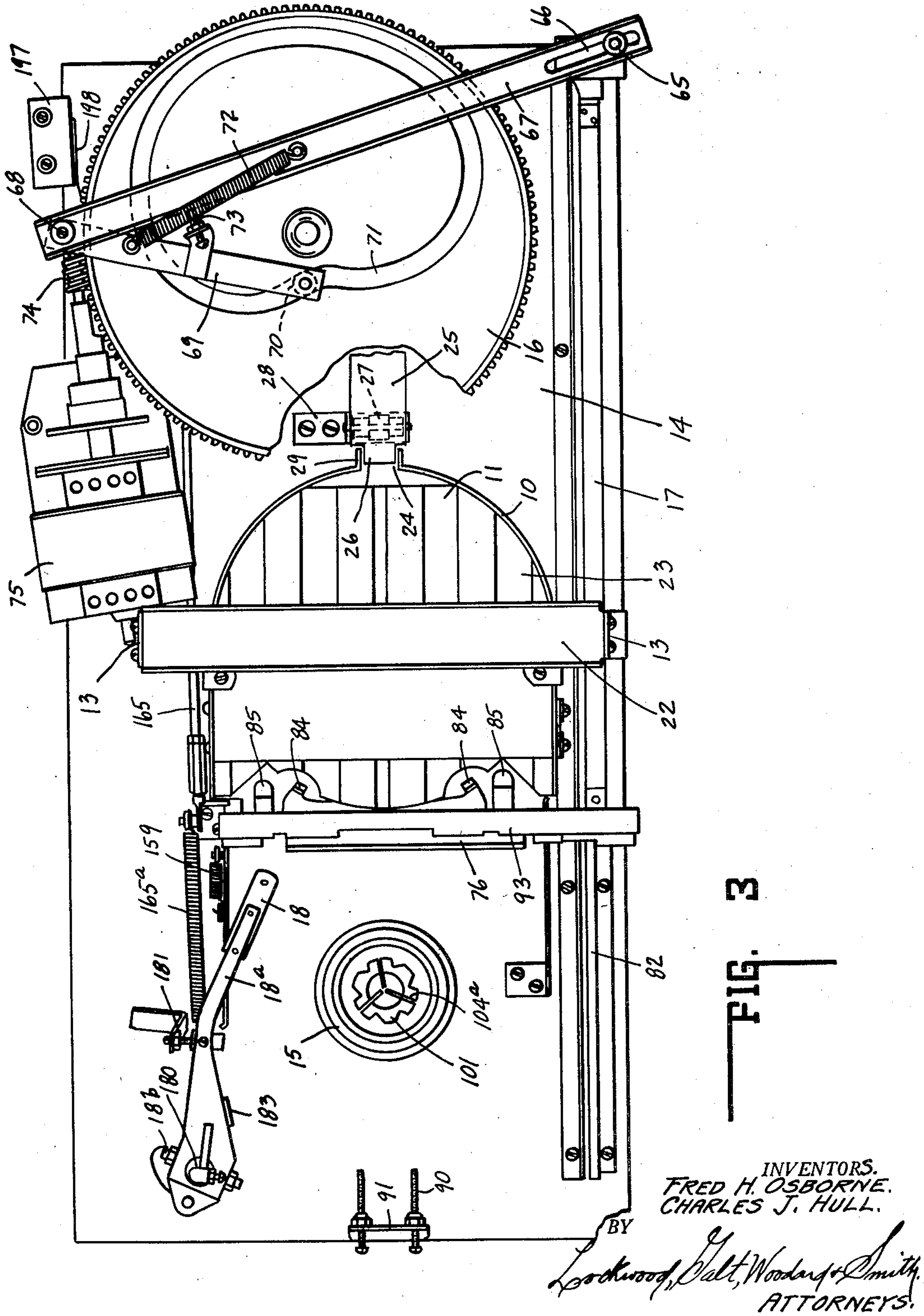
Fig. 3 is a top plan view of the record changer with parts broken away and omitted for clearness, viewed from the back side of the chassis.

Referring to Figs. 1, 2 and 3, the general character of the phonograph herein shown may be briefly described as comprising an elevator type of magazine 10 having a series of horizontal shelves 11 closely spaced to receive in the spaces therebetween a series of thin vinylite phonograph records 12 of that type having an enlarged center opening and generally referred to as a "seven inch" record. However, with slight modifications the invention is equally applicable to the larger records of the ten or twelve inch type having a smaller opening. The magazine is slidable up and down in the laterally spaced upright guides 13—13*a* carried by a base plate 14. Through selective control of the movement of the magazine, it is brought to rest with a selected record substantially in the plane of a horizontal turntable 15, whereupon through the control of a record changing cam 16, a reciprocating carriage 17 causes the selected record to be slid from its supporting shelf directly onto the turntable 15.

Depending upon conditioning mechanism to be hereinafter described for reproducing the upper or lower side of the record thus transferred to the turntable, the turntable with the record clamped thereto is either raised to bring the record into reproducing engagement with the upper reproducer 18 or the lower reproducer 19 through raising or lowering of the turntable. Upon completion of the reproduction of the record, the turntable and record are raised or lowered, as the case may be, from reproducer engagement and the carriage 17 is caused to engage the far side of the record to slide it from the turntable back upon its shelf in the magazine 10. This completes one cycle comprising the reproduction of a selected side of a selected record.

*The magazine*

The magazine 10 is guided in its vertical positioning between the upper guides 13 extending upwardly from the base plate 14 and the lower guides 13*a* extending downwardly from the base plate braced by a depending bracket 20 and a bottom plate 21, the upper guides being secured by a cross bar 22. The magazine is provided with a top cover plate 23 and is enclosed by a generally cylindrical wall open toward the turntable to accommodate the diameter of a record, which wall carries the series of spaced shelves 11. Opposite the turntable side, the magazine is provided with a narrow opening extending vertically thereof, indicated at 24, of just sufficient width to admit therethrough a pusher bar 25 having a reduced record engaging tongue 26. Said pusher bar is supported and guided on a rubber roller 27 rotatably mounted on a bracket 28 carried by the base plate 14. A series of guide teeth 29 extends radially outwardly of the magazine beveled to guide the pusher bar 25 into the space between the shelves and align the tongue 26 with the edge of the record.

Figure 13:
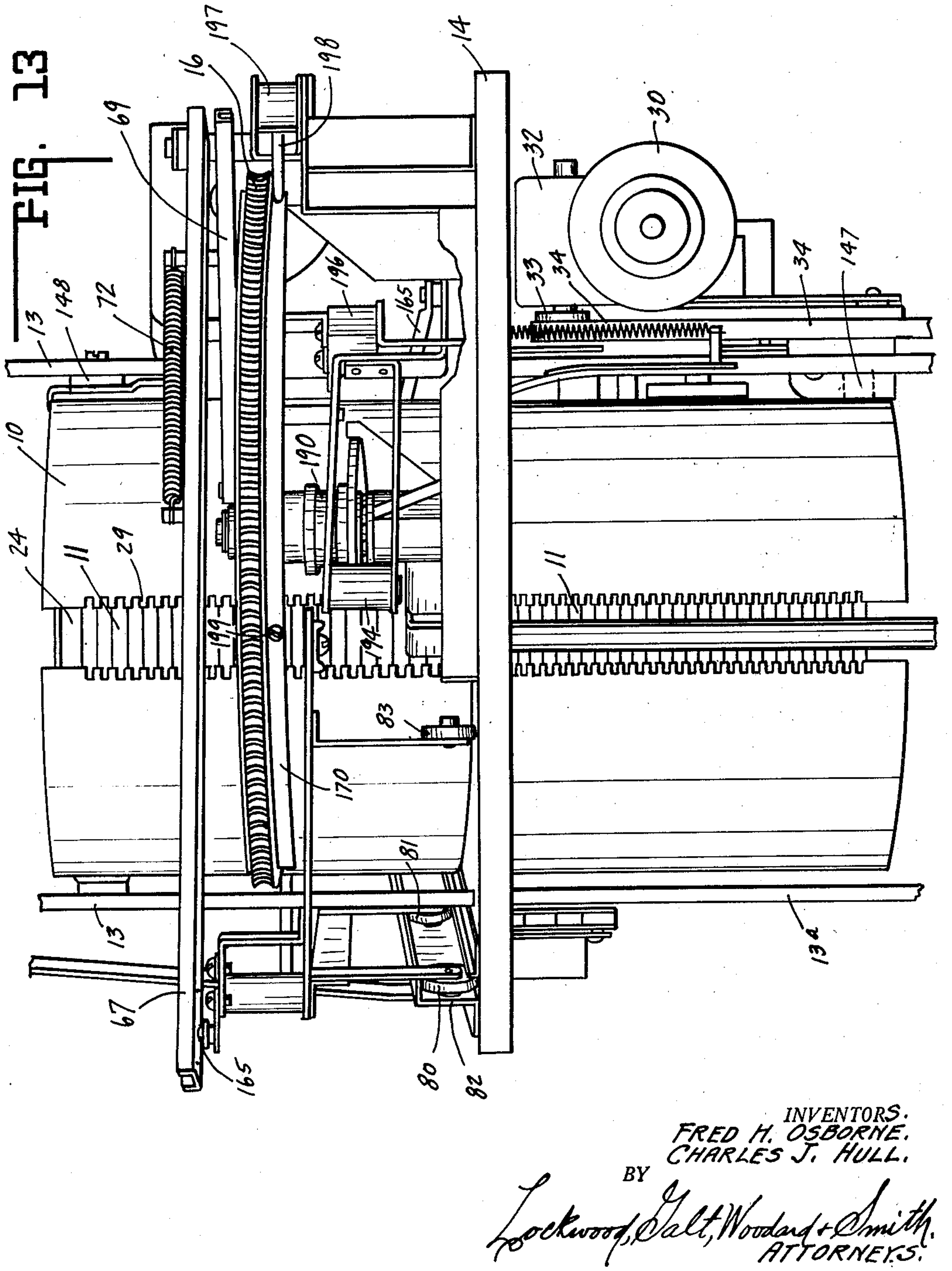
Fig. 13 is an end elevation of the record changer chassis viewed toward the record transfer cam and control mechanism.

The magazine is elevated between the guides 13, 13*a* by a motor 30 (Fig. 2). Said motor is mounted on a bracket 31 depending from the base plate 14 and through reduction gearing in a housing 32 drives a winding drum 33 (Fig. 13). Rolled upon the drum 33 there is a magazine elevating tape 34 of highly flexible but strong material, anchored at its lower end to a lower guide roller 35 carried by a downwardly extending arm 36 of a bracket 37 secured to the lower end of the magazine. The motor 30 is of the reversible type and when driven in one direction rolls up the tape 34 which moves the magazine upwardly, and when driven in the opposite direction reverses the roller 33 to control the lowering of the magazine by gravity. The selective positioning of the magazine is effected through the de-energizing of the motor 30 with the magazine at the selected position, as hereinafter described.

*Record selection*

Figures 7, 8:
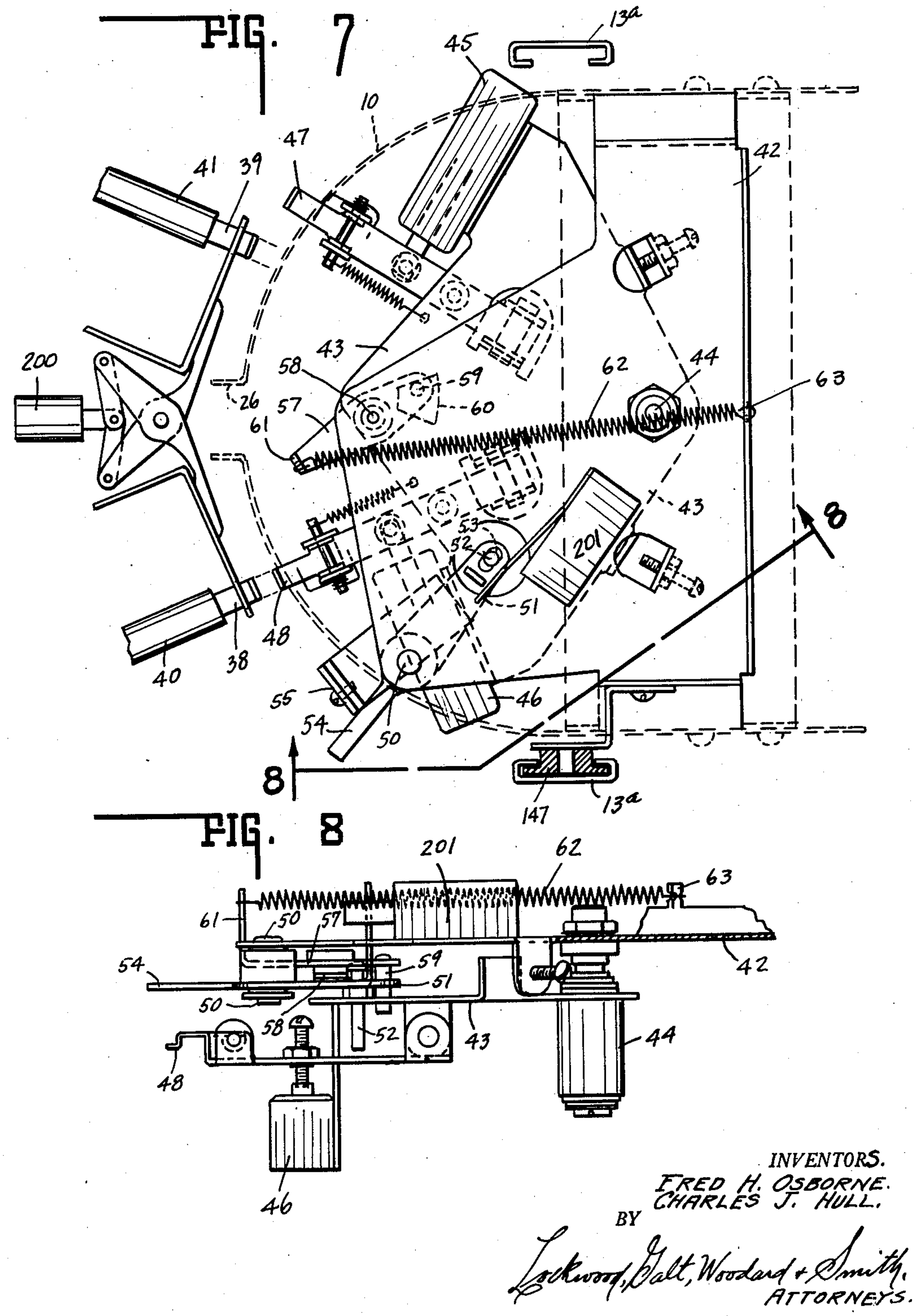
Fig. 7 is a plan view of the swing plate depending from the bottom of the magazine for determining and selecting the side of the record to be reproduced.
Fig. 8 is a side sectional view of the swing plate and mounting viewed substantially on the line 8—8 of Fig. 7.

For selecting the record to be reproduced, the magazine is positioned with the selected record opposite the pusher bar 25. This occurs when the magazine is arrested in its upward or downward travel by de-energizing the motor 30. For this purpose any well known type of selector may be employed (not shown) having a series of selector pins, one for each side of each record. Said selector pins may be selectively extended by a push button operated electric solenoid, and retracted from extended position by a cancelling solenoid. For illustration there is indicated in Fig. 7 two vertical columns of selector pins 38 and 39 actuated by their respective solenoids 40 and 41, respectively. Below the magazine and movable therewith there is a fixed plate 42 mounting a swing plate 43 thereunder, said swing plate being pivotally supported by said fixed plate to swing about a pivot 44. The swing plate carries a micro switch 45 on one side thereof and a micro switch 46 on the other side. The micro switch 45 is controlled by a contact finger 47, and the micro switch 46 is controlled by a contact finger 48 (Fig. 7).

Said switches are electrically connected with the magazine raising and lowering motor 30 and are normally in closed circuit condition. Upon one of the selector pins 38, 39 being projected into the path of the respective micro switch control fingers 47, 48 during the up or down movement of the magazine, the circuit to the motor is broken and the magazine immediately brought to rest at the selected position according to the relative position of the projected selector pin. Through this arrangement a record is selected by arresting the magazine with such record lying in the plane of the turntable and the pusher bar 25.

To select the side of the record to be reproduced the swing plate 43 is caused to shift about its pivotal mounting 44 to register one or the other contact fingers 47 or 48 with its bank of selector pins. When one of said fingers is in registry with its bank of selector pins, the other pin is out of registry, and vice versa.

Fulcrumed upon the fixed plate 42 at 50 there is a conditioning lever 51 having a downwardly extending lug 52 engaging the swing plate 43 through an elongated slot therein indicated at 53. Said lever 51 is provided with an outwardly extending finger 54 movable up and down with the magazine in a path to engage a camming bracket 55 secured to the bottom frame plate 21. When the magazine reaches its lowermost position (see Fig. 2), said finger 54 engages the camming bracket 55, and when it reaches its uppermost position, said finger 54 engages an upper camming bracket 56 extending downwardly from the base plate 14. For retaining the swing plate in its position conditioned by one or the other of said brackets, there is an over-center lever 57 fulcrumed on the fixed plate 42 at 58 having a lug 59 extending through an opening 60 in the swing plate. Said lever 57 has an upstanding tip 61 connected by a spring 62 to the fixed plate at 63.

When the magazine reaches its lowermost position, the finger 54 of the conditioning lever 51 strikes the bracket 55 which throws the swing plate to one side to bring the contact 48 into alignment with the bank of selector pins 38. Having been thrown by the conditioning lever into its position, it is held therein by the over-center tension of the spring 62 acting on the over-center lever 57. When the magazine reaches its uppermost position, said conditioning lever is cammed in the opposite direction by the camming bracket 56 which moves the swing plate to the opposite position against the over-center tension of spring 62 which aligns the contact finger 47 with the bank of selector pins 39.

Thus, when the magazine is moving upwardly the selector pins 38 will be effective to stop the motor 30 for playing the top side of the record selected thereby. When the magazine is moving downwardly the bank of selector pins 39 is rendered effective to similarly stop the motor 30 for reproducing the bottom side of the record. Thus, of any pair of pins 38, 39 lying in the same plane, the pin 38 will select the top side of a record, and the pin 39 will select the bottom side through the medium of the conditioning mechanism to be hereinafter described.

*Record transfer mechanism*

As above described, the selected record is transferred from the magazine onto the turntable 15 by the pusher bar 25. Said pusher bar is fixedly secured and moves with the reciprocating carriage 17. At one corner of the carriage 17 there is provided a roller 65 operating in an elongated slot 66 (Fig. 3) of the carriage actuating arm 67. The other end of said arm is pivoted at 68 to a cam lever 69 having a follower 70 at its opposite end which rides in a cam track 71 in the upper face of the cam gear 16. Said lever and arm are connected together by a tension spring 72, and the lever is provided with an adjustable stop 73 limiting the inward movement of the arm relative thereto. The cam gear 16 is provided with external worm gear teeth driven by a worm 74 carried by the shaft of a record transfer motor 75 supported on the base plate 14. Through the action of the cam track 71 said lever and arm actuate the carriage in a direction to slide the record into center position on the turntable 15 when moved in one direction during a half cycle of the cam. Thereupon the motor 75 is de-energized by the record trip switch, arresting the movement of the cam and carriage during the playing of the record. Upon the record being played, the cam motor is energized by the record trip switch to rotate the cam gear a second half revolution of the cycle, moving the carriage in the reverse direction to slide the record from the turntable back into its compartment in the magazine.

Figures 4, 5, 6:
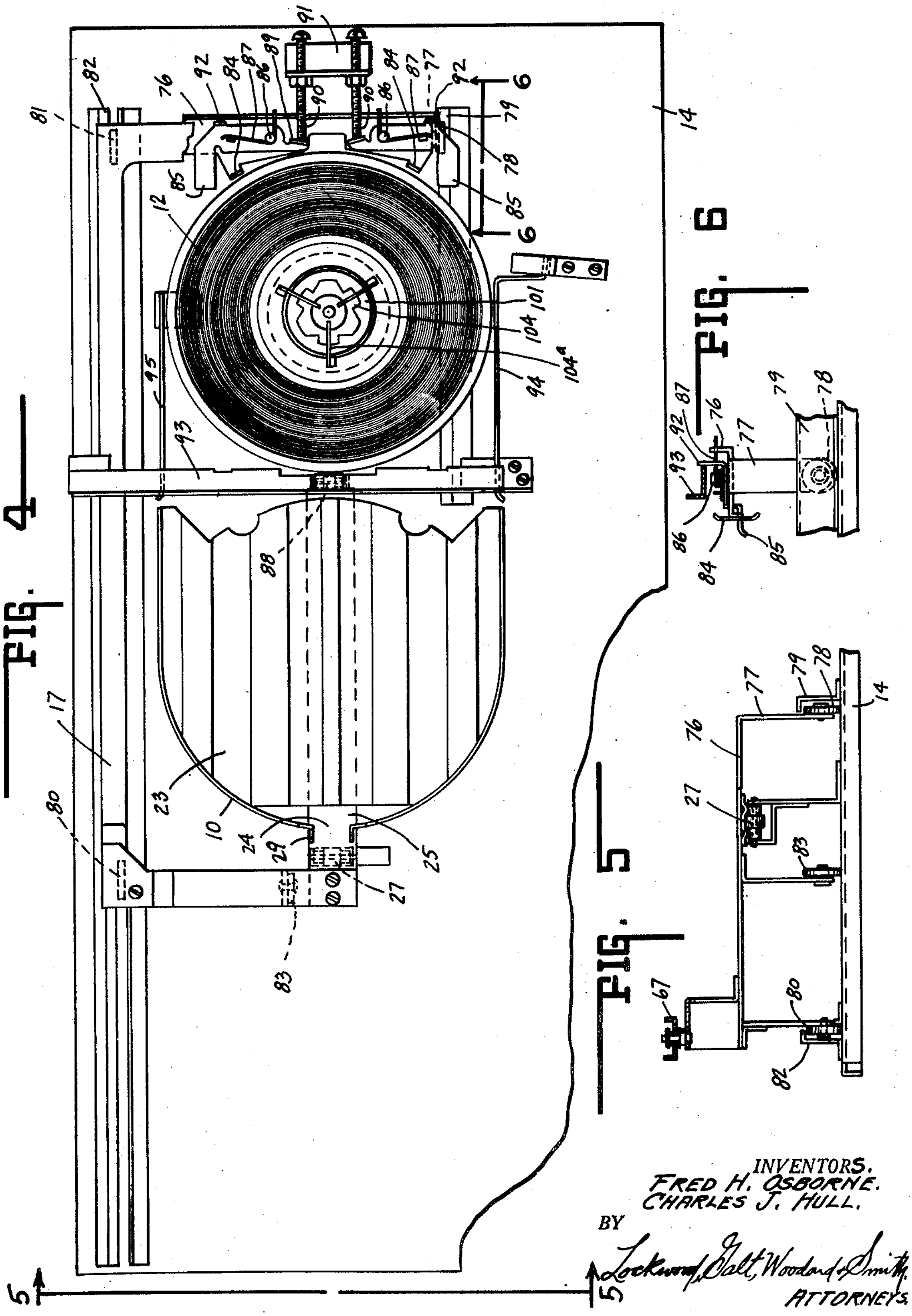
Fig. 4 is a plan view with parts removed, illustrative of the record pusher carriage and record on the turntable viewed from the front side of the chassis.
Fig. 5 is a fragmentary elevational view taken on the line 5—5 of Fig. 4 with parts removed.
Fig. 6 is a fragmentary elevational view taken on the line 6—6 of Fig. 4 with parts removed.

For thus returning the record, the carriage is provided with a return bar 76 on the opposite side of the magazine from the pusher bar 25 (Figs. 3, 4 and 6). It is rigidly secured to the carriage at one end and extends transversely between the magazine and turntable, being supported at its free end by a downwardly extending leg 77 mounting a roller 78 riding on the base plate within a guide rail 79. In this connection it may be noted that the carriage as a whole is supported for reciprocable movement by a pair of rollers 80 and 81 riding on the base plate 14 within a guide rail 82. A fourth roller 83 supports the pusher end of the carriage on the base plate.

The return bar 76 is formed with a pair of spaced pusher heads 84 for engaging the record on each side of its center line of movement to slide it from the turntable into the magazine. For assisting the sliding action and relieving any frictional resistance due to the rubber ring of which the turntable is formed, there is a pair of lifting fingers 85, each fulcrumed upon the return bar at 86 and normally urged to a forward position by a spring 87 and limited in their travel by the pusher heads 84. Said fingers are curved downwardly from a shoulder arranged to engage the edge of the record so that their tip ends slide under the record and cam it upwardly into a slightly tilted position free of the turntable after the forward edge of the record engages and is supported by a rubber roller 88. The record engaging ends of said lifting fingers extend forwardly from their fulcrumed mounting at 86 and are each provided at their opposite ends with an ear 89 positioned to engage the adjustable stops 90 carried by a bracket 91 on the base plate 14. Said lifting fingers are also each provided with an upstanding ear 92 positioned to engage a fixed cross frame member 93. At each side of the record 12 there are mounted fixed guide plates 94 and 95 to guide the record laterally into the magazine.

The above arrangement is such that with the record playing and the carriage having completed its travel to place the record into playing position, the ears 89 of the lifting fingers bear against their respective stops 90, thus retracting the fingers against the tension of their springs 87 free of the record. Upon completion of the playing of the record as the carriage moves in a direction to transfer the record to the magazine, the fingers leave the stops 90, whereupon the springs swing them under the edge of the record on the turntable, lifting the record free of the table as it is moved over the roller 88 by the pusher heads 84. As the record is pushed completely into the magazine, the ears 92 engage the frame member 93, withdrawing the fingers from underneath the record, permitting it to drop into supported position on its magazine shelf.

*Turntable*

Figures 9, 10:
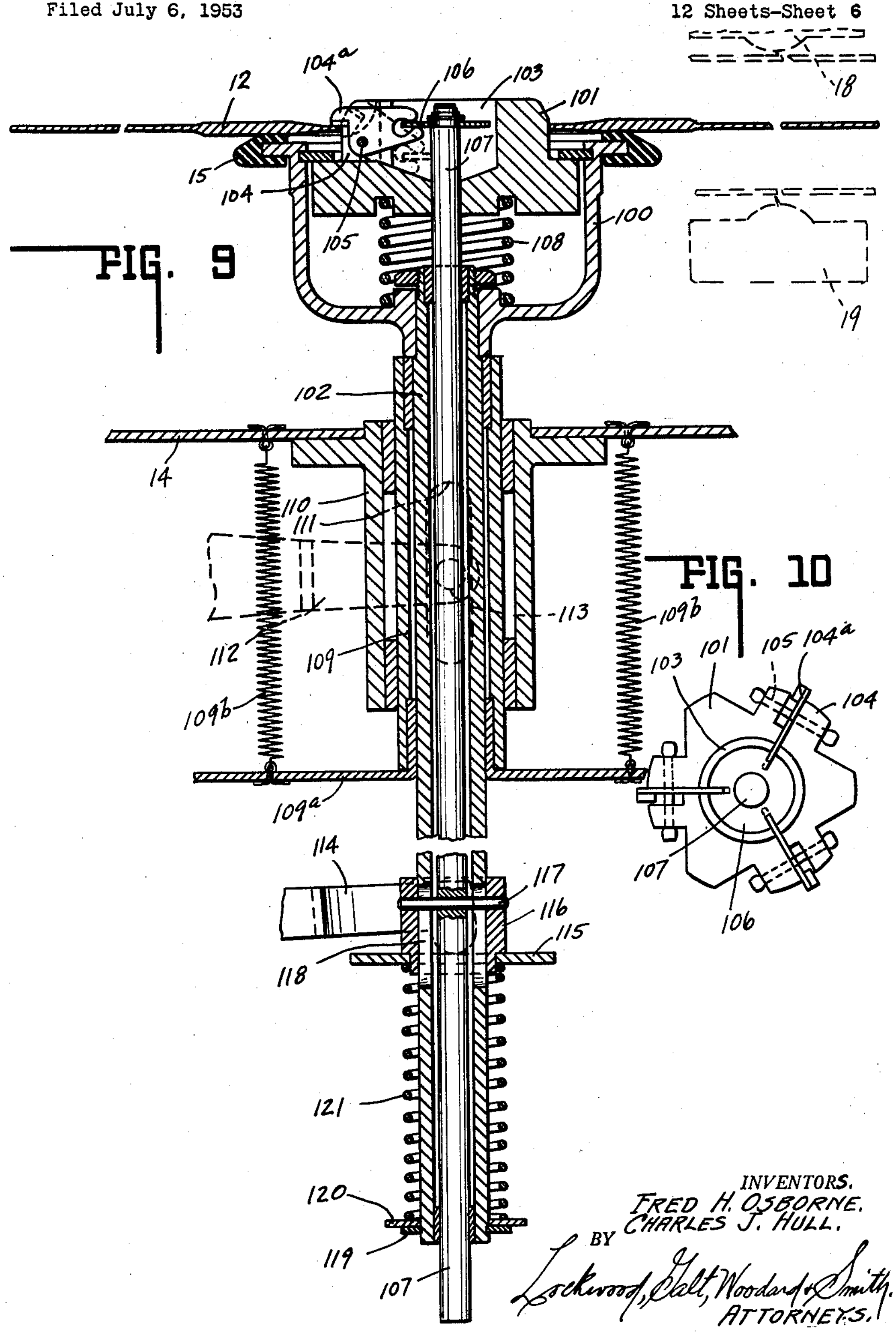
Fig. 9 is a central vertical section through the turntable and associated mechanism, broken away intermediate the ends thereof showing a record in centered and clamped position.
Fig. 10 is a plan view of the record centering head and clamping fingers.
Figure 11:
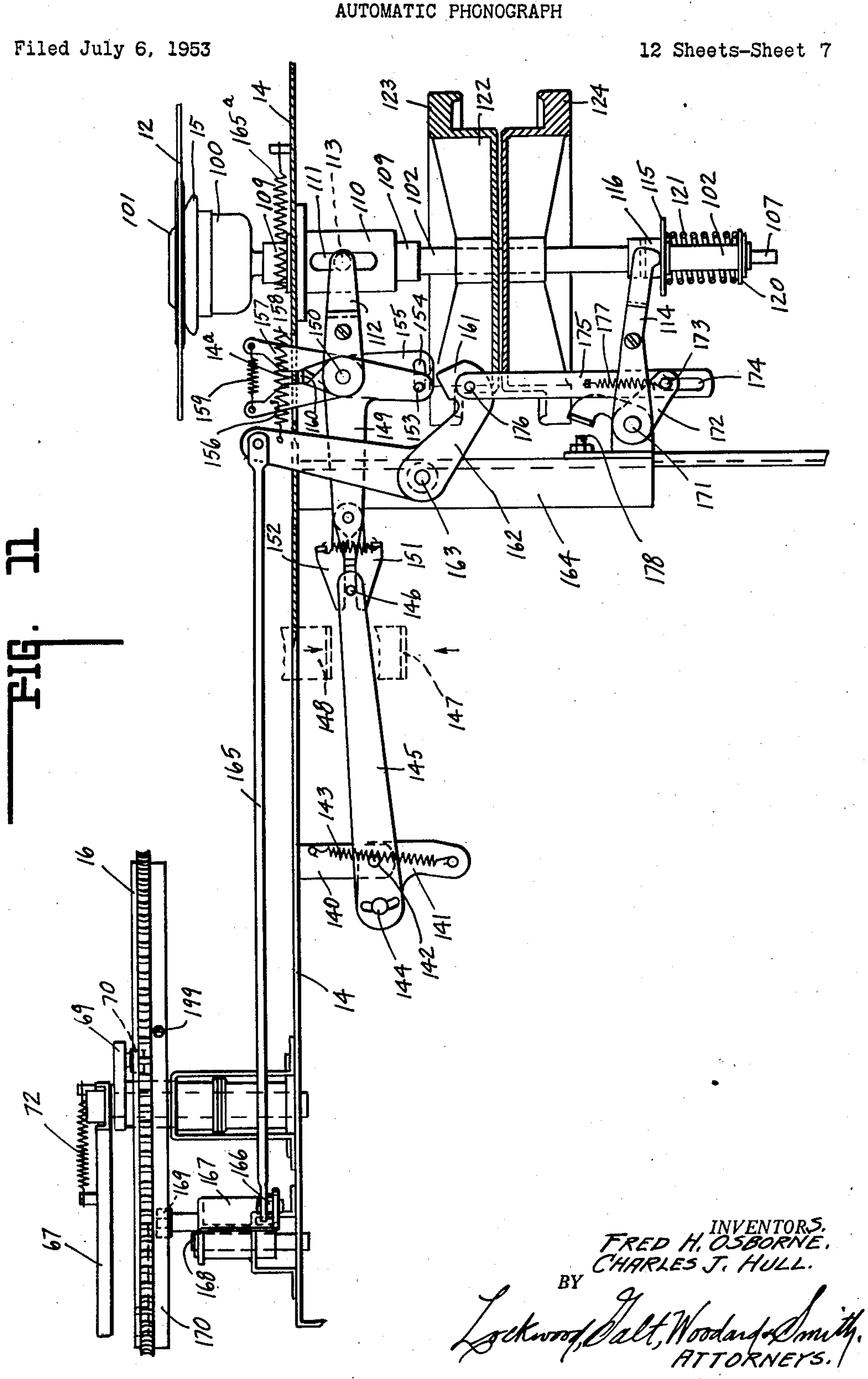
Fig. 11 is a side elevation illustrating the working parts of the record changer controlling the centering and clamping of the record, the direction of drive of the turntable, and the movement of the turntable to present the selected side of the record for play.

As shown in Figs. 9 and 11, the turntable 15 comprises a rubber record supporting ring upon which a record 12 is received from the magazine and supported for rotation. The rubber ring is carried by an outstanding flange surrounding a cup-shaped mounting 100, embracing therein a record centering and clamping head 101 adapted to extend through the enlarged opening in the record 12 after it has been moved into position on the turntable. The turntable and its mounting 100 are supported for up and down reciprocable movement and rotation on a rotating tubular turntable shaft 102. The centering head, as shown in Figs. 9 and 10, is formed with a central pocket 103 and radial arm portions 104, each of which is radially and centrally slotted to receive a record clamping finger **104*a* fulcrumed therein by a hinge pin 105. Each of the clamping fingers is bifurcated at its inner end to receive an actuating disk 106 fixedly mounted on the upper end of a clamping rod 107 slidable through the centering head and the turntable mounting. Interposed between the centering head and the mounting there is a compression spring 108** urging the centering head upwardly into record centering position.

Figure 12:
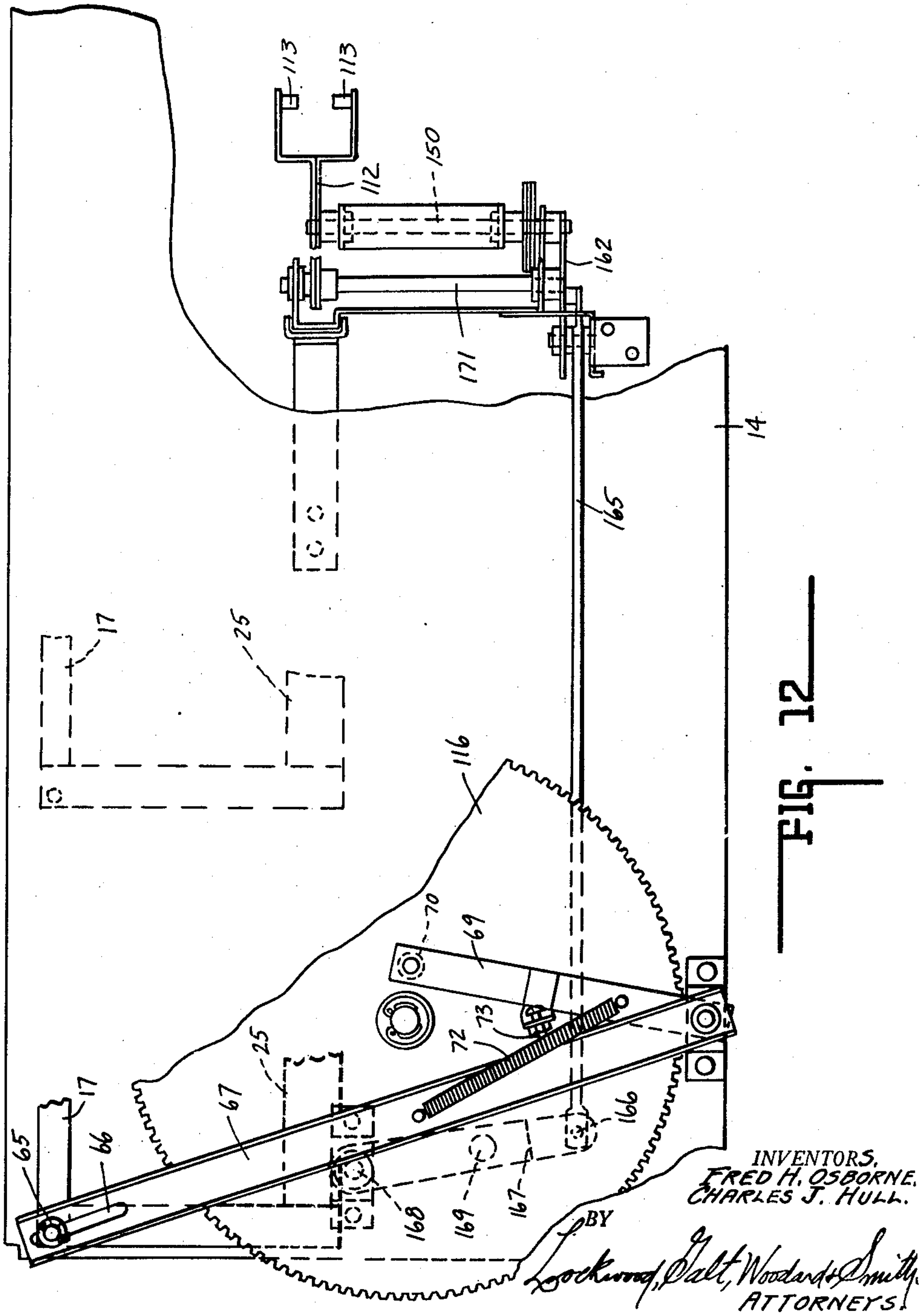
Fig. 12 is a plan view illustrative of parts of the record changer shown in Fig. 11 with parts broken away and parts removed for clearness.

The turntable shaft 102 rotates within suitable bearings contained in a turntable elevating and depressing carriage 109 which is slidably mounted in an elongated bearing sleeve 110 secured to and depending downwardly from the base plate 14 and provided with an elongated slot indicated at 111. A turntable raising and lowering bifurcated arm, indicated at 112, straddles the bearing sleeve and is provided with a pair of inwardly extending lugs 113 extending through the elongated slot into actuating engagement with the carriage 109 upon which the turntable and its shaft are supported (Figs. 11 and 12). Upon said arm elevating the carriage through said lugs, the turntable is raised from its record receiving position to engage the record with the upper reproducer 18 for reproduction of the top side of the record. When the arm is moved downwardly, it lowers the turntable into engagement with the lower reproducer 19 for reproduction of the bottom side of the record. When the arm is in its intermediate position, it maintains the turntable in the plane of the selected record for transfer of the record.

A second bifurcated clamping arm 114 (Fig. 11) is actuated to bear downwardly on a disk 115 in which a collar 116 is rotatable and pinned to the clamping rod 107 by a pin 117 (Fig. 9). Said pin extends through an elongated slot 118 in the turntable shaft 102. The lower end of the turntable shaft has secured thereto a mounting 119 upon which a disk 120 is rotatably mounted, and between the disks 120 and 115 there is provided a compression spring 121 against which the arm 114 operates.

When the arm 114 is depressed, it moves the clamping rod 107 downwardly against tension of the spring 121. This action, when in lowered position, raises the outer tips of the clamping fingers **104*a* upwardly and out of the way of a record being transferred onto the turntable. In such depressed position it also carries the centering head 101 downwardly against the tension of the spring 103 to its depressed position below the plane of the turntable so that the record may readily slide over the centering head. When the record is transferred onto the turntable over the centering head and in centering alignment therewith, the said arm 114, activated by the cam gear 16, raises to permit spring 121 to elevate the clamping rod which permits the centering head to protrude upwardly through the center opening of the record for centering it on the turntable, the disk 106 thereupon forcing the clamping fingers downwardly into clamping engagement with the central portion of the record. Thus, the record after being received on the turntable free of obstruction of the centering head and clamping fingers, will be centered and firmly clamped to the turntable under tension of the spring 121**.

Figure 14:
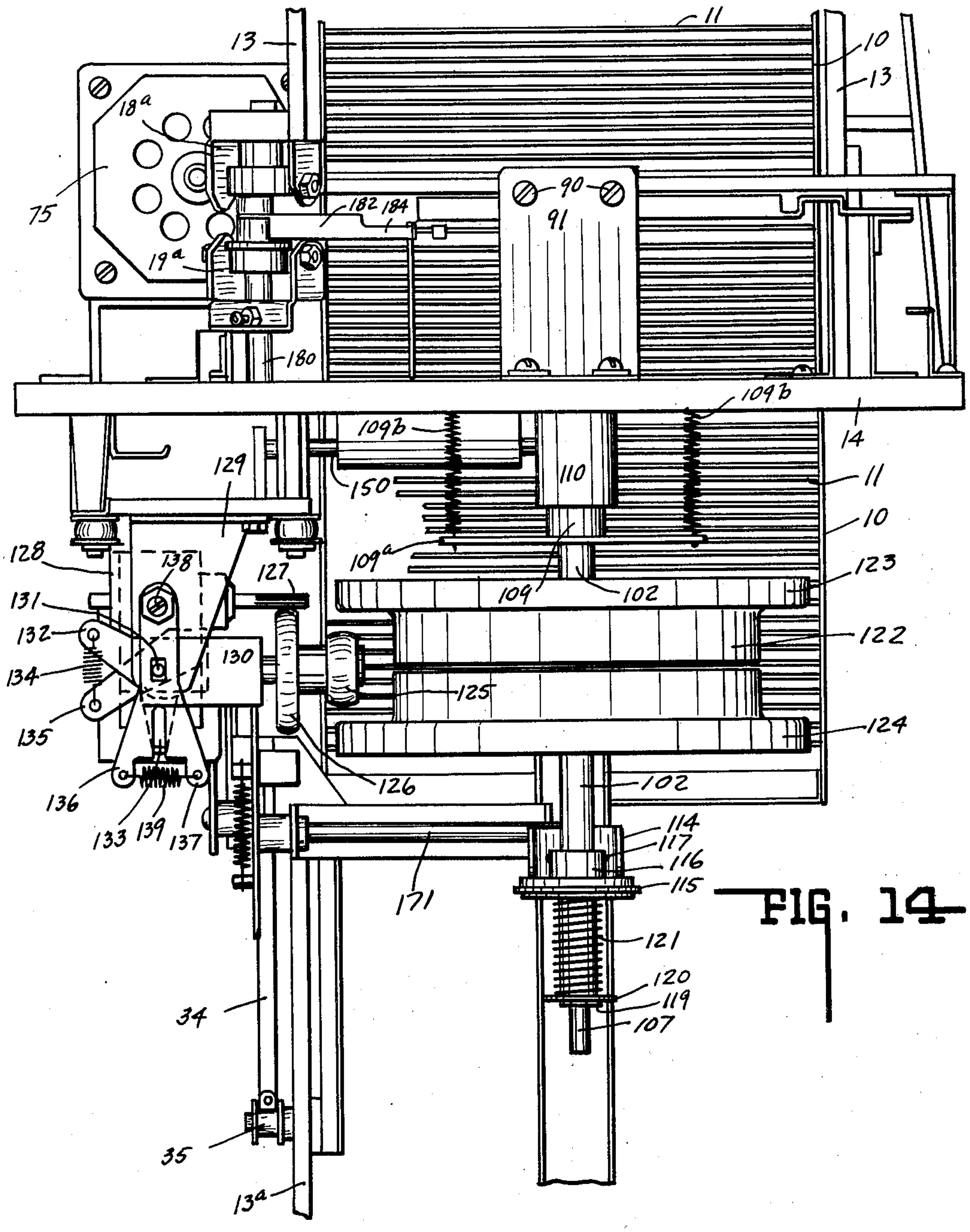
Fig. 14 is an end view of a portion of the record changer chassis viewed from the turntable end opposite that of Fig. 13, with parts removed for clearness and illustrative of the turntable motor drive.

Referring to Figs. 11 and 14, the turntable is rotated by the turntable drive in the form of a heavy mass flywheel 122, shown as made in two parts but operating as a single unit. The flywheel is rigidly secured to the drive shaft 102 intermediate the control arms 112 and 114. Thus, as the turntable raising and lowering arm 112 operates, the fly wheel 122 raises and lowers with it. It is provided with an upper driven flange 123 and a lower driven flange 124. Intermediate the flanges there is a motor driven driving roller 125 in position to be engaged by the upper flange when the turntable is lowered for driving it in one direction, and by the lower flange when the turntable is raised for driving it in the opposite direction. In Fig. 14 said roller is shown in neutral position relative to the fly wheel out of driving engagement with either flange. The driving roller is driven by a friction wheel 126 which in turn is driven by a friction shaft 127 of a turntable motor 128 carried by a bracket 129 having a vibration insulating mounting from the underside of the base plate 14.

Due to this arrangement it will be observed that when the record is elevated to play the upper side, it will be rotated through the lower flange 124 in the usual clockwise direction. When it is lowered to play the underside of the record, it will be rotated in the opposite direction through the flange 123. The friction wheel and driving roller are carried on a bracket 130 fulcrumed on pin 131 formed with an upwardly protruding arm 132 and a downwardly extending finger 133. The arm 132 is connected by a tension spring 134 to an arm 135 secured to the motor 128. Through the tension of spring 134 the friction wheel 126 is thereby held in friction contact with the motor shaft 127.

For maintaining the drive roller in its neutral position and also yieldingly urging it into friction driving relation with one or the other drive flanges 123, 124, there is a pair of arms 136 and 137 both pivotally connected by an eccentric mounting 138 on the supporting bracket 129. Said arms are apertured to embrace the pin 131 and are yieldingly connected by a spring 139 to embrace and bear against the finger 133 of the bracket mounting 130. Thus, if the flange 124 is raised into driving engagement with the roller 125, it will move the roller slightly upwardly, swinging the arm 137 to the right against the tension of the spring 139 which will urge it into frictional engagement. The reverse action through arm 136 would occur when the flange 123 is lowered into driving contact with the roller. For adjusting the roller 125 midway between the flanges the eccentric 138 may be adjusted.

*Selection of the record side to be reproduced and turntable control*

Referring to Figs. 11 and 12, the base plate 14 carries a depending bracket 140 on which a bell crank lever 141 is fulcrumed at 142. The end of the bell crank lever is connected with the bracket by an over-center spring 143. Adjustably secured to the opposite end of the bell crank lever at 144 there is a conditioning arm 145 having an actuating pin 146 adjacent its free end. The magazine carries arm engaging elements indicated at 147, mounted near its lower end, and 148 mounted near its upper end so positioned as to engage the conditioning arm and swing it from a lower to an upper position. It is engaged by the element 147 to move it upwardly when the magazine reaches its uppermost position and the lowermost record within the magazine lies within the plane of the turntable. Element 148 engages it to move it downwardly when the magazine reaches its lowermost position and the uppermost record of the magazine lies in the plane of the turntable, the magazine reversing its movement at each such position.

The conditioning arm operates a bell crank lever 149 fulcrumed on a transverse rod 150 extending below the base plate 14. Said lever is yieldingly actuated by the pin 146 through the spring pressed jaws 151, 152. The opposite and depending end of the bell crank lever 149 is provided with a pin 153 extending through a slot 154 in an arm 155. The arm 155 is secured to the transverse rod 150 as is also the turntable raising and lowering bifurcated arm 112. The arm 155 is held in its centered position by the spring pressed fingers 156, 157. Said fingers extend through slots 158 in the base plate and are drawn against the portion 14*a* thereof by a spring 159. They yieldingly grip a protruding ear 160 at the upper end of the arm 155 therebetween. Thus, through the medium of said fingers, the arms 155 and 112 are each held centered in neutral position with the pin 153 freely riding in the slot 154 for movement to one end or the other by the conditioning arm 145.

The turntable is yieldingly supported in its normal intermediate record changing positions by the anchoring plate 109*a* secured to carriage 109, said plate being yieldingly suspended from base plate 14 by the springs 109*b*. When the conditioning arm 145 is forced to its lower position upon abutting the upper element 148, the pin 153 is swung to the right-hand end of the slot 154 in arm 155. When the conditioning arm 145 is moved upwardly through engagement with the element 147, the pin 153 is swung to the extreme left of the slot 154. This positions or conditions the pin 153 to be engaged by one side or the other of a camming head 161 on a bell crank lever 162 fulcrumed at 163 upon a depending mounting bracket 164. Since the pin 153 is positioned at one or the other end of the slot 154 in the arm 155, when the head 161 of lever 162 moves upwardly, it engages the pin on one or the other side thereof which swings the arm 155 in a direction to raise or lower the turntable through the arm 112. Thus, if the pin 153 is conditioned by arm 145 to the right of the head 161 (Fig. 11), the turntable will be raised to play the upper side of the record. If said pin is conditioned to the left, the turntable will be lowered to play the underside of the record.

The actual raising and lowering of the turntable, having been thus conditioned to determine the direction of movement, is effected through the bell crank lever 162 by a link 165 actuated by the cam gear 16. Said link is pivotally connected at 166 to a cam actuated arm 167 which is pivoted at its other end at 168 on an upstanding bracket. Secured to said arm intermediate its ends there is a cam follower 169 operating on a cam profile 170 on the underside of the cam gear under tension of the spring 165*a*. Said spring has one end connected to bell crank lever 162 and the other end to the base plate 14.

The selection of the side of the record to be reproduced is, therefore, effected through the conditioning arm 145 while the selected side of the record is moved by the turntable into reproducer engagement by operation of the cam gear through the head 161 of bell crank lever 162.

For centering the record on the turntable and clamping it thereon, as above described, the record clamping arm 114 is secured to a transverse rod 171, the actuated end of which is secured to a bell crank lever 172 having one end thereof provided with a pin 173 operating in an elongated slot 174 of a connecting link 175. Said link is pivotally connected at its upper end to the camming head 161 at 176. The pin 173 is yieldingly connected to said link by a tension spring 177. The other end of the bell crank lever 172 is flanged to engage an adjustable stop 178 on the bracket 164.

With the turntable in its intermediate record receiving position, the centering head 101 and clamping fingers 104*a* are in lowered position against the tension spring 121 because of the lowered position of the link 175 with the pin 173 engaging the upper end of the slot 174 therein. The record is placed on the turntable, and as the actuating head 161 moves upwardly preparatory to raising or lowering the turntable, the link 175 moves up with it, raising the clamping arm 114 so that the spring 121 raises the centering head to center the record and the actuating disk can force the clamping fingers 104*a* into record clamping position. The record is then centered and clamped before it is sufficiently raised or lowered to engage the reproducer.

After reproduction, through the cam profile 170 the camming head 161 is lowered, permitting the spring 159 to return the arms 112 and 155 to their neutral position, with the consequent positioning of the turntable with the record free of the reproducer and lying in the plane of its compartment in the magazine. The pin 173 then causes the record clamping arm 114 to retract the centering head and raise the clamping fingers to free the record for transfer from the turntable.

*Tone arm mounting*

Figures 17, 18, 19:
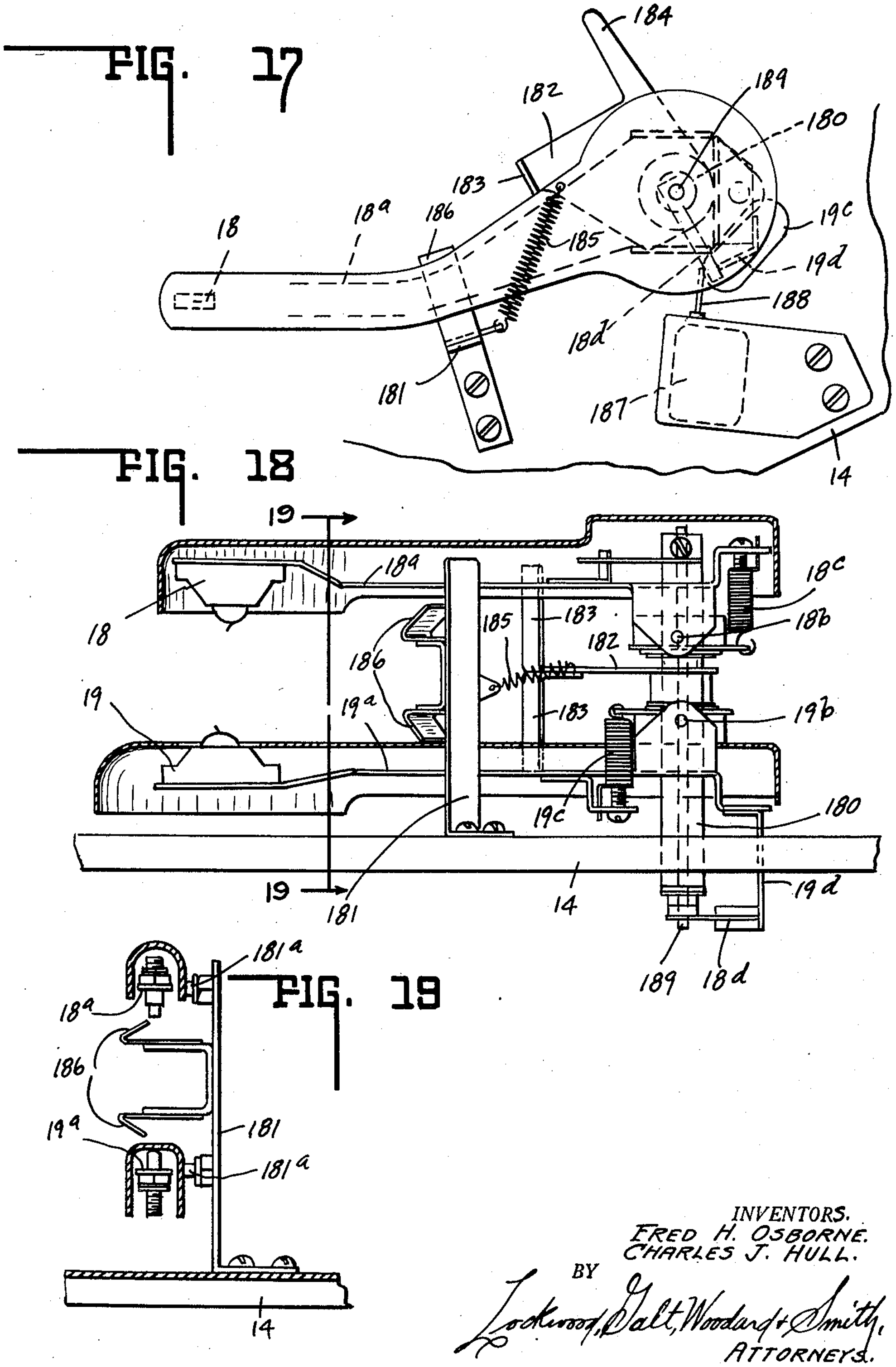
Fig. 17 is a plan view of the upper tone arm and control mechanism with parts removed.
Fig. 18 is a side elevation of the tone arms and control mechanism with parts removed.
Fig. 19 is a view with parts removed taken on the line 19—19 of Fig. 18.

For selectively playing either side of the record there are provided dual reproducers 18 and 19, as shown in Figs. 17, 18 and 19. Both reproducers are carried by the tone arms 18*a* and 19*a*, respectively, which are mounted on a swivel support 180 for laterally swinging inward of the record, and to which they are pivotally mounted at 18*b* and 19*b*, respectively, for vertical oscillation. The upper tone arm is balanced by the balance spring 18*c* and the lower tone arm by the balance spring 19*c*. To one side of the tone arms and carried by a bracket 181 there are provided adjustable stops 181*a* to limit their outward swing for positioning them adjacent the peripheral edge of the record. After playing the record, they are moved outwardly against the stops on the bracket 181 by a tone arm return lever 182 having upwardly and downwardly extending arms 183 for engagement therewith, respectively. Said return lever is mounted about the swivel support intermediate the two tone arms and has a laterally projecting finger 184 extending into the path of movement of the cross bar 76 on the carriage 17. Said return lever is connected with the stop bracket 181 by a tension spring 185. Also mounted on the stop bracket 181 there is a pair of spring latches 186 reversely arranged and in yielding frictional engagement with the respective tone arms.

With the above arrangement, the tone arms are normally held in their outer position against the stops 181*a* on stop bracket 181 under tension of spring 185 and frictional engagement with the latches 186. Upon a record being moved into playing position on the turntable, the arm 184 of the return lever 182 is engaged by the carriage 17, swinging the bracket free of both tone arms. The tone arms are then held in their outer position merely by the spring latches 186. When the record is moved into engagement with one or the other reproducer, it raises or lowers, as the case may be, the engaged tone arm free of its spring latch so that the engaged reproducer will be free to move inwardly during reproduction, whereas the other tone arm still latch engaged will be restrained in its outer position.

Mounted below the base plate 14 there is provided a trip switch 187 having a contact arm 188 positioned to be engaged by a lever 18*d* or 19*d*. The lever 18*d* is secured to a rod 189 extending centrally through the swivel support and connected to the upper tone arm 18*a*. The lever 19*d* is secured directly to the lower tone arm 19*a* extending through a slot in the base plate. In the usual manner, upon the upper tone arm reaching its innermost position on the record, the lever 18*d* will actuate the trip switch to set the record changing mechanism into operation, as hereinafter described. Similarly when the lowermost tone arm reaches its innermost position on the record, its lever 19*d* will actuate the trip switch. When this occurs, the record will be released from the turntable and its engagement with the reproducer and be moved by the carriage 17 into the magazine, the carriage releasing the bracket 182 to return the operated tone arm back to its outermost position.

*Electric control mechanism and circuits*

Rotatable with the cam gear 16 on the underside thereof is a circuit control disk 190 (Figs. 15, 16) provided on its lower periphery with a recess 191 and axially offset therefrom on its upper periphery with a recess 192. Disk 190 supports a downwardly extending projection 193. Mounted on suitable brackets carried under the base plate 14 adjacent the control disk 190 there is a single pole, single throw, full cycle microswitch 194 having a spring actuating arm engageable by the pin 193 and operable thereby; a single pole, double throw, microswitch 195 having a spring actuating arm movable into and out of the recess 192; and a single pole, single throw, normally open record stop switch 196 similarly having a spring actuating arm movable into and out of recess 191.

A cancel switch 197 (Fig. 13) is mounted adjacent the periphery of the cam gear, having a spring actuating arm 198 bearing against the under profile 170 of said gear to be engaged and actuated by a projection 199. The switch 197 controls a cancel-out solenoid, diagrammatically illustrated at 200 (Fig. 7), for retracting the selector pins 38, 39, from their projected effective position immediately after engagement with one of the fingers of the magazine control switches 45, 46 in a well known manner, not shown herein.

Connected with the reversible magazine motor 30 there is provided the switch 201 mounted on plate 42 (Fig. 7) and controlled by finger 54 when it engages camming brackets 55 or 56 at the lowermost position of the magazine or at the uppermost position of the magazine, respectively. Also connected with the reversible magazine motor 30 there is provided the double pole, double throw, motor reversing switch 202 mounted on base plate 14 in position to be actuated alternately by arm engaging elements 147 or 148 when the magazine reaches its uppermost or lowermost positions, respectively. A pair of bale switches 203 are mechanically linked with selector pins 38, 39 (not shown), for actuation by either of said pins when a selection is made.

Figures 15, 16, 20:
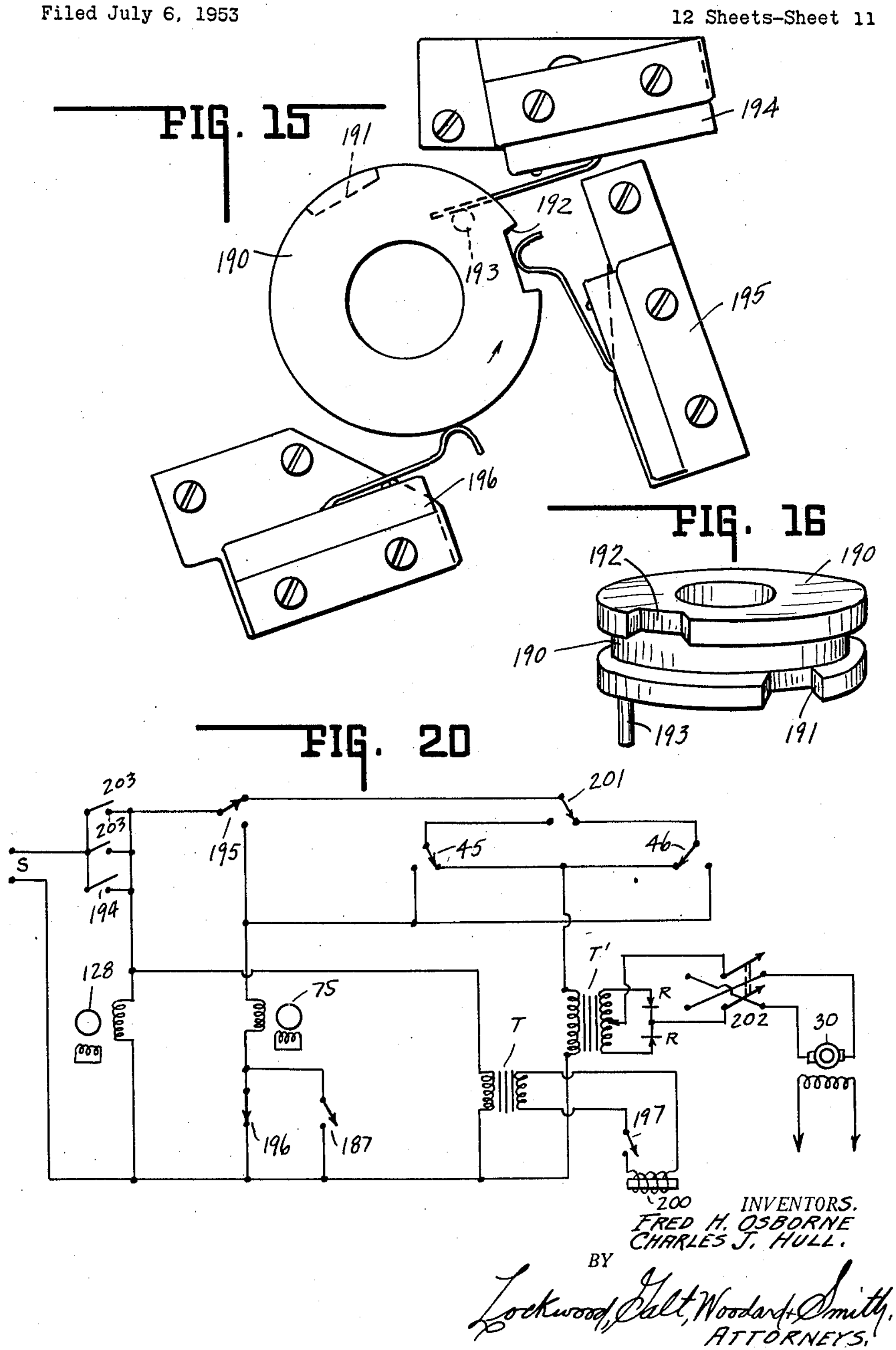
Figure 15 is a schematic view of the control disk for the electric circuit located immediately below the cam gear.
Fig. 16 is a perspective view of the circuit control disk shown in Fig. 15.
Fig. 20 is the wiring diagram showing the electric control circuit.

Referring to the circuit shown in Fig. 20, the phonograph is wired to a current source S, turntable motor 128 being connected across source S in series with the bale switches 203 and the full cycle micro-switch 194, these switches being connected in parallel with one another. The main cam motor 75 is also connected across source S in series with switches 194, 203, one pole of double pole switch 195, and record trip switch 187, together with record stop switch 196, the latter two switches being connected in parallel with one another.

Cancel solenoid 200 is connected across the secondary of transformer T which in turn is connected across the source S in series with switches 194 and 203. Switch 197, connected in series with cancel solenoid 200, controls its operation.

The reversible magazine motor 30 is fed from a transformer T′ through a full wave rectifier R, R and the double pole, double throw, motor reversing switch 202. Transformer T′ is connected across source S through switches 194, 203, 195, 201 and one or the other of the magazine control switches 45 and 46, depending upon the position of switch 201. Switches 45 and 46 provide alternate connections to energize the reversible magazine motor 30 or the main cam motor 75. As shown, switches 45 and 46 are positioned to energize transformer T′, but in their alternate positions they serve to complete a circuit from switch 201 to main cam motor 75, as will be obvious from Fig. 20.

Upon a selection being made, one of the selector pins 38, 39 is projected into the path of movement of one or the other fingers of switches 45, 46 carried by the magazine. All switches illustrated in Fig. 20 are shown in their idle positions; that is, the positions assumed when the phonograph is not running and no selection has been made. Simultaneously with projection of one of the selector pins, one of the two bale switches 203 closes to energize the complete circuit. Switches 195, 201 and 46 in the position shown in Fig. 20 are effective to energize transformer T', and reversing switch 202 will be closed in one or the other of its alternate positions, thereby energizing magazine motor 30 and causing it to raise or lower the magazine, according to its preceding direction of movement, until one of the contact fingers on switches 45, 46 carried by the magazine engages the selected pin 38 or 39. Assuming that the magazine is travelling upwardly, switch 46 will be actuated by a selected projector pin 38 breaking the circuit to magazine motor 30 and bringing the magazine to rest for presenting the record corresponding to selector pin 38. Actuation of switch 46 transfers power to cam motor 75, which actuates the transfer carriage for transferring the selected record from the magazine onto the turntable.

Cam motor 75 having been energized, the cam gear rotates and therewith rotates disk 190 closing switch 194 and shifting switch 195 to connect main cam motor 75 directly with closed switch 194. Switch 194 serves to hold the power circuit closed after the last selection is cancelled with both selector bale switches 203 open. Switch 195 having been shifted, cam motor 75 is continuously energized after switch 46 is opened by retraction of selector pin 38. Such retraction occurs when cancel solenoid 200 is energized by closure of switch 197, the contact finger of which is engaged by the projection 199 on the periphery of the cam gear.

After the selected record is transferred to the turntable, switch 196 is opened by engagement of its spring actuating arm with recess 191 of control disk 190, thereby to de-energize cam motor 75. The record is then in playing position with the record transfer mechanism at rest. The turntable motor, having been energized through original closure of the switches 203 and 194, rotates the turntable for record reproduction until the end of the record is reached. Thereupon, the trip switch 187 is closed by the reproducing tone arm, which again energizes cam motor 75, neither switch 194 nor switch 195 having changed position. The cam gear is then rotated through the second half of the cycle to cause the transfer carriage to slide the record back into the magazine. Control disk 190 rotates with the cam gear, returning switches 194 and 195 to their original positions illustrated in Fig. 20.

If the bale switches 203 are open, the cycle is complete, and the machine comes to rest; but if the switches are still closed, the machine repeats the same cycle to reproduce another record.

In this connection it may be noted that as the magazine travels upwardly, the swing plate carrying switches 45, 46, and the conditioning arm 145 are in such position that the projected selector pins 38 will be effective for engagement by the contact finger 48 of the switch 46 to thereby cause the top side of the record to be reproduced.

When the magazine reaches the top of its travel, the swing plate and conditioning arm are cammed to their other position, bringing the contact fingers 47 of the switches 45 into alignment with selector pins 39, which selection will reproduce the bottom side of the record. If it is desired to play opposite sides of the same or different records, both selector pins 38 and 39 will be projected outwardly. If at the last operation the magazine was travelling upwardly, it will continue to travel upwardly so that if the pin 38 is above the finger 48, a corresponding record will have its top side played. Upon completion the magazine will travel to its uppermost position, whereupon the swing plate and conditioning arm will be reversed, so that on its downward travel the contact finger 47 will engage the finger 39, causing the bottom side of the selected record to be played.

Thus, if the bottom of the record is selected by a selector pin 39 while the magazine is in its upward travel, at the top thereof it will operate switches 201 and 202. Switch 201 conditions switch 45 for actuation by a selector pin 39, while switch 202 reverses the reversible D.C. magazine motor 30, to change the direction of travel of the magazine from an upward direction to a downward direction. Thereupon switch 45 upon being operated by a selector pin 39 stops the magazine motor and causes the cam motor 75 to operate. The machine then follows the same cycle of movement as above described.

The invention claimed is:

1. In an automatic phonograph, a vertically reciprocable magazine having a plurality of horizontal record receiving shelves, each supporting a record thereon, means for raising and lowering said magazine and arresting it at a selected position, a turntable mounted for rotation adjacent said magazine normally in the plane of the selected record, power actuated record transfer means including a reciprocating carriage movable transversely relatively to said magazine and turntable for engaging and sliding the selected record from the magazine onto the turntable for play and from the turntable into the magazine after play, a centering and record gripping head on said turntable movable into and out of record centering and gripipng position, mechanism actuated in timed relation with the transfer of a record onto said turntable for actuating said head to grip the record thereto, conditioning mechanism actuated by the movement of said magazine to select the side of the record to be reproduced, actuating mechanism operably connected with said record transfer means movable in timed relation therewith to raise or lower the turntable from its normal position in accordance with said conditioning mechanism, an upper reproducer positioned above said turntable and a lower reproducer below said turntable selectively engageable by said record to reproduce the selected side thereof according to the selective raising or lowering of the turntable, and means effective at the completion of play of said record by one of said reproducers to cause said actuating mechanism to return the turntable to neutral position and release said record for return to said magazine.

2. In an automatic phonograph, a rotatable turntable mounted for axial displacement, an elevator type magazine having a series of vertically spaced compartments containing a corresponding series of records to be reproduced, a magazine raising and lowering drive, selector means for arresting said drive to position the magazine with a selected record in the plane of said turntable, a record transfer carriage movable through said magazine to engage and slide the selected record from the magazine onto said turntable and return it from said turntable to the magazine after play, a power driven cam for actuating said carriage, dual reproducers spaced above and below the plane of said turntable in position to be engaged by the upper or lower side of said record respectively, a centering and clamping head on said turntable, mechanism for rendering said head effective for centering and clamping said record when moved in one direction and releasing it when moved in the opposite direction, actuating mechanism operably connected with said last-mentioned mechanism in timed relation therewith to raise the turntable and record for playing engagement with the upper reproducer and lower them for playing engagement with the lower reproducer, and conditioning mechanism movable according to the direction of travel of the magazine for effecting said actuating mechanism to determine the direction of displacement of the turntable and side of the record to be reproduced.

3. In an automatic phonograph having a movable magazine containing a plurality of records for reproduction of a selected side thereof, an axially displaceable turntable mounted for rotation in a horizontal plane, means for transferring a selected record from the magazine to the turntable for reproduction and from the turntable to the magazine after reproduction, a pair of spaced reproducers mounted on said phonograph to be selectively engaged by the upper side of the record for reproduction thereof upon the turntable being displaced upwardly and the under side thereof upon the turntable being displaced downwardly, means for displacing said turntable, and mechanism selectively controlled by the movement of the magazine for conditioning said turntable displacing means to determine its direction of displacement for playing the selected side of the record.

4. In an automatic phonograph having a movable magazine containing a plurality of records for reproduction of a selected side thereof, an axially displaceable turntable mounted for rotation in a horizontal plane, means for transferring a selected record from the magazine to the turntable for reproduction and from the turntable to the magazine after reproduction, a pair of spaced reproducers mounted on said phonograph to be selectively engaged by the upper side of the record for reproduction thereof upon the turntable being displaced upwardly and the under side thereof upon the turntable being displaced downwardly, a support for said turntable biased to position said turntable for receiving and discharging a record, a cam actuated lever mechanism operably connected with said support for raising or lowering said turntable into record playing position, and mechanism controlled by the direction of movement of said magazine for selectively conditioning said lever mechanism to determine the displaced position of the turntable for playing the selected side of the record.

5. In an automatic phonograph having a vertically movable magazine containing a plurality of records for reproduction of a selected side thereof, an axially displaceable turntable mounted for rotation in a horizontal plane, means for transferring a selected record from the magazine to the turntable for reproduction and from the turntable to the magazine after reproduction, a pair of spaced reproducers mounted on said phonograph to be selectively engaged by the upper side of the record for reproduction thereof upon the turntable being displaced upwardly and the under side thereof upon the turntable being displaced downwardly, a support for said turntable biased to position said turntable for receiving and discharging a record, a lever mechanism operably connected with said support for raising and lowering said turntable into record playing position, means time controlled by said transfer means for actuating said lever mechanism upon transfer of the record from the magazine to the turntable, and mechanism controlled by the direction of movement of said magazine for selectively conditioning said lever mechanism to determine the displaced position of the turntable for playing the selected side of the record.

6. In an automatic phonograph having a vertically movable magazine containing a plurality of records for reproduction of a selected side thereof, an axially displaceable turntable mounted for rotation in a horizontal plane, means for transferring a selected record from the magazine to the turntable for reproduction and from the turntable to the magazine after reproduction, a pair of spaced reproducers mounted on said phonograph to be selectively engaged by the upper side of the record for reproduction thereof upon the turntable being displaced upwardly and the under side thereof upon the turntable being displaced downwardly, a support for said turntable biased to position said turntable for receiving and discharging a record, a lever mechanism operably connected with said support for raising and lowering said turntable into record playing position, means time controlled by said transfer means for actuating said lever mechanism upon transfer of the record from the magazine to the turntable, mechanism carried by and movable with said magazine for selectively conditioning said lever mechanism to determine the displaced position of the turntable for playing the selected side of the record, and means for engaging and shifting said mechanism at predetermined positions in the travel of said magazine.

7. In an automatic phonograph having a vertically movable magazine containing a plurality of records for reproduction of a selected side thereof, an axially displaceable turntable mounted for rotation in a horizontal plane, means for transferring a selected record from the magazine to the turntable for reproduction and from the turntable to the magazine after reproduction, a pair of spaced reproducers mounted on said phonograph to be selectively engaged by the upper side of the record for reproduction thereof upon the turntable being displaced upwardly and the under side thereof upon the turntable being displaced downwardly, a support for said turntable biased to position for receiving and discharging a record, a lever mechanism operably connected with said support for raising and lowering said turntable into record playing position, means time controlled by said transfer means for actuating said lever mechanism upon transfer of the record from the magazine to the turntable, mechanism carried by and movable with said magazine for selectively conditioning said lever mechanism to determine the displaced position of the turntable for playing the selected side of the record, vertically disposed banks of selector pins mounted adjacent said lever mechanism, one bank for selecting one side of a record and the other bank for selecting the other side of the record, means for projecting a pin from one of said banks into record selecting position, a swing plate carried by and movable with said magazine adjacent said banks of selector pins, switch control members carried by said swing plate, and means for swinging said plate to position one of said members for engagement with a selected pin upon said magazine reaching a predetermined position and swinging said plate to an alternate position for causing the other member to engage a selected pin in the other bank upon reaching a second predetermined position in accordance with the direction of movement of said magazine and the conditioning thereby of said lever mechanism, engagement of one of said members by a selector pin arresting the movement of the magazine to present a selected record to the turntable and the selected side of the record being presented to one of said reproducers by said displacement effected through conditioning of said lever mechanism in accordance with the direction of movement of the magazine and the position of said swing plate.

8. In an automatic phonograph having a vertically movable magazine containing a plurality of records for reproduction of a selected side thereof, an axially displaceable turntable mounted for rotation in a horizontal plane, means for transferring a selected record from the magazine to the turntable for reproduction and from the turntable to the magazine after reproduction, a pair of spaced reproducers mounted on said phonograph to be selectively engaged by the upper side of the record for reproduction thereof upon the turntable being displaced upwardly and the under side thereof upon the turntable being displaced downwardly, a support for said turntable biased to position said turntable for receiving and discharging a record, a cam actuated lever mechanism operably connected with said support for raising or lowering said turntable into record playing position, mechanism controlled by the direction of movement of said magazine for selectively conditioning said lever mechanism to determine the displaced position of the turntable for playing the selected side of the record, a pair of laterally offset banks of vertically disposed selector pins, a swing plate movable with said magazine adjacent said selector pins, means for swinging said plate to one position during upward movement of said magazine and to an alternate position upon the downward movement thereof, and circuit control switches carried by said plate positioned thereby for engagement with a selected pin in one or the other banks thereof depending upon the position of said plate to arrest the magazine in position for transfer of the selected record and reproduction of the selected side thereof.

9. In an automatic phonograph, a turntable adapted to receive a record for selective reproduction of either side, a reproducer positioned to be engaged by the record for reproduction thereof, a clamping and centering head carried by and normally positioned within said turntable, means for projecting said head axially from said turntable into the center opening of said record, and a plurality of clamping members carried by said head movable by its projection into said record for clamping said record against said turntable.

10. In an automatic phonograph, a turntable adapted to receive a record for reproduction, a reproducer positioned to be engaged by the record for reproduction thereof, a clamping and centering head operatively associated with and centrally disposed with respect to said turntable and normally positioned inwardly of the plane of the record receiving surface of said turntable, means for projecting said head axially from said turntable into the center opening of said record, and record clamping mechanism carried within said head and movable by projection of said head into said opening for clamping said record against said turntable.

11. In an automatic phonograph, a turntable adapted to receive a record for selective reproduction of either side, a reproducer positioned to be engaged by the record for reproduction thereof, means for presenting a selected side of the record to the reproducer, a clamping and centering head axially movable relative to said turntable into and out of the center opening of said received record for centering said record upon the turntable, an axially-disposed control rod extending into said head for controlling its said movement relative to said turntable, means for actuating said rod, and a plurality of record clamping fingers pivotally mounted within said head movable by said rod to clamp the inner peripheral edge of said record to said turntable upon said head being moved to record centering position and release said record upon said head being moved out of record centering position.

12. In an automatic phonograph, a turntable comprising a housing and a friction record supporting ring carried about the periphery of said housing for engaging and rotating a record within the playing grooves thereof for exposing either side of said record for reproduction, means for rotating said turntable housing, an axially displaceable record centering head within said housing spring biased outwardly therefrom to record centering position, an actuating rod extending axially into said housing and head for retracting said head against spring tension into said housing and out of record centering position, a plurality of radially disposed clamping members pivotally mounted within said head, each of said members movable into and out of position to engage and clamp the inner peripheral edge of said record against said turntable, and means on said rod for moving said clamping members into and out of record clamping position in timed relation with the movement of said head into and out of record centering position.

13. In an automatic phonograph, a turntable adapted to receive a record for selective reproduction of either side, a reproducer positioned to be engaged by the upper side of the record upon axial displacement of the turntable upwardly, a reproducer positioned to be engaged by the under side of the record upon the turntable being displaced downwardly, means for selectively displacing said turntable, a clamping and centering head axially movable within said turntable to project upwardly therefrom into record centering position upon a record being received upon said turntable and retracted downwardly into said turntable for freeing the record, a spring carried by said turntable normally urging said head into upwardly extending record centering position, a plurality of radially disposed record clamping fingers pivotally mounted within said head, an axially disposed control rod extending into said head operably connected with said fingers, and means for actuating said control rod in one direction to permit projection of said head into record centering position and movement of said fingers therewith into record clamping position and in the opposite direction to swing said clamping members out of record engagement within said head and retract said head against the tension of said spring free of record centering position.

14. In an automatic phonograph having a movable magazine containing a plurality of records for reproduction of a selected side thereof, an axially displaceable turntable mounted for rotation in a horizontal plane, means for transferring a selected record from the magazine to the turntable for reproduction and from the turntable to the magazine after reproduction, a pair of spaced reproducers mounted on said phonograph to be selectively engaged by the upper side of the record for reproduction thereof upon the turntable being displaced upwardly and the under side thereof upon the turntable being displaced downwardly, means for displacing said turntable, a bell crank lever having one end operably connected with said turntable for axially displacing said turntable from its normal record receiving position to selected engagement with one of said reproducers, a camming lever having opposed camming surfaces engageable with the opposite end of said bell crank lever for causing it to elevate said turntable upon being engaged by one of said camming surfaces and lower said turntable upon being engaged by the opposed camming surfaces, cam actuated linkage for operating said camming lever in timed relation with the transfer of a record upon said turntable, and mechanism selectively controlled by the direction of movement of the magazine for conditioning the engaged portion of said bell crank lever for engagement by one or the other of said camming surfaces to determine the direction of axial displacement of the turntable.

15. In an automatic phonograph, a vertically reciprocable magazine having a plurality of horizontal record receiving shelves, each supporting a record thereon, means for raising and lowering said magazine and arresting it at a selected position, a turntable mounted for rotation adjacent said magazine normally in the plane of the selected record, a reciprocating carriage movable in a horizontal plane into and out of said magazine for sliding the selected record from said magazine into centering position on said turntable, said carriage including means for returning a reproduced record from the turntable to the magazine comprising a return bar including a pair of spaced pusher heads for engaging the far side of the record on each side of its center line, a pair of lifting fingers fulcrumed on said return bar positioned to slide under the far edge of said record and cam it upwardly into slightly tilted position free of the turntable during its removal therefrom, and laterally disposed guide members positioned forwardly of said magazine for guiding and directing said records from the turntable thereto.

16. In an automatic phonograph, a movable magazine for receiving a plurality of records movable to position for selectively presenting a selected record for transfer to a turntable, pusher means for pushing a selected record from the magazine into centering position on the turntable, and a record return member operable in timed relation therewith engageable with the far edge of said record to move it from the turntable to the magazine, said member including a record lifting lever fulcrumed thereon in position to engage and tilt the record away from the turntable to free it therefrom during the return movement of the record from the turntable, and mechanism operatively associated with said lever and said member for moving said lever into pushing and tilting engagement with a record in response to movement of said member.

17. In an automatic phonograph, a vertically reciprocable magazine having a plurality of horizontal receiving shelves, each supporting a record thereon, means for raising and lowering said magazine and arresting it at its selected position, a turntable mounted for rotation adjacent said magazine normally in the plane of the selected record, a supporting frame for said magazine and turntable, a record transfer carriage provided with supporting rollers tracking on said frame, a pusher bar fixedly secured and movable with said carriage to engage the near edge of a record in said magazine and slide it into centering position on said turntable upon said carriage moving in one direction, a return bar mounted on said carriage located on the opposite side of the magazine from said pusher bar, a pair of spaced pusher heads on said return bar engageable with the edge of a record on said turntable to slide it from the turntable to the magazine, a pair of lifting fingers on said return bar associated with said pusher heads adapted to engage under the edge of the record for tilting it upwardly from said turntable as said pusher heads push it therefrom into the magazine, means on said fingers for retracting them under spring tension free of the record when in playing position, and a motor driven cam operably connected with said carriage for moving it through a half cycle to place the record in playing position and through a following half cycle to move it for returning the record from playing position to the magazine.

18. In an automatic phonograph, a turntable adapted to receive a record for reproduction of either side, a reproducer carrying tone arm positioned on each side of the record when in position upon the turntable for selectively reproducing opposite sides thereof, means for mounting said tone arms to swing radially inward of the record to permit the reproducer to follow the playing grooves thereof, means for pivotally mounting said tone arms to swing to and from said record into and out of groove engaging position, tone arm balancing springs operable to bias said reproducers into groove engaging position, means for moving said tone arms and record relative to each other for selective engagement of one of said reproducers with its corresponding side of the record, a pair of spring latches fixedly mounted on said phonograph adjacent the peripheral edge of the record carried by said turntable, said latches being reversely arranged to extend in yielding frictional engagement with the respective tone arms for normally holding said tone arms in their outer position beyond the periphery of said record, one of said tone arms being released from its engaged latch by movement thereof upon its reproducer engagement with said record, a record transfer carriage for transferring said record after reproduction to the magazine and returning a record from the magazine to the turntable, and means operable by said carriage for returning said released tone arm to its latched position upon said carriage moving in a direction to move the record from the turntable.

19. In an automatic phonograph, a turntable comprising an annular friction ring, means for transferring a phonograph record transversely of said turntable to a centering position relative thereto, a clamping and centering head carried by and normally positioned within said turntable out of the path of movement of the record to centering position, means for projecting said centering head axially from said turntable into the center opening of said record upon said record being positioned in said centering position, and a plurality of clamping members carried by said head movable by its projection into the center opening of said record for centering and clamping it against said turntable.

20. In an automatic phonograph, a turntable comprising an annular friction ring, means for transferring a phonograph record transversely of said turntable to a centering position relative thereto, a clamping and centering head carried by and normally positioned within said turntable out of the path of movement of the record to centering position, means for projecting said centering head axially from said turntable into the center opening of said record upon said record being positioned in said centering position, a plurality of clamping members carried by said head movable by its projection into the center opening of said record for centering and clamping it against said turntable, and means for returning said head to within said turntable and disengaging said clamping members from said record to permit transverse movement thereof from said turntable.

21. In an automatic phonograph, a turntable comprising an annular friction ring, means for transfering a phonograph record transversely of said turntable to a centering position relative thereto, a clamping and centering head axially movable relative to said turntable into and out of the center opening of said record for centering said record upon the turntable, an axially disposed control rod extending into said head for controlling its movement relative to said turntable, means for actuating said rod, and a plurality of record clamping fingers pivotally mounted within said head movable by said rod to clamp the inner peripheral edge of said record to said turntable upon said head being moved to record centering position and release said record upon said head being moved out of said record centering position.

22. In an automatic phonograph, a turntable comprising an annular friction ring, means for transferring a phonograph record transversely of said turntable to a centering position relative thereto, an axially displaceable record centering head normally positioned within said turntable spring biased outwardly therefrom to record centering position, an actuating rod extending axially into said head for retracting said head against spring tension into said turntable and out of record centering position, a plurality of radially disposed clamping members pivotally mounted within said head, each of said members movable into and out of position to engage and clamp the inner peripheral edge of said record against said turntable, and means on said rod for moving said clamping members into and out of record clamping position in timed relation with the movement of said head into and out of record centering position.

23. In an automatic phonograph, a turntable comprising a housing and a friction record supporting ring mounted about the periphery of said housing, means for transferring a phonograph record into record playing engagement with said turntable, a clamping and centering head within said housing spring biased outwardly therefrom to record centering position and retractable into said turntable housing for freeing the record therefrom, a spring carried by said housing engageable with said head to normally urge said head outwardly from said housing to project from said turntable into record centering position, a plurality of radially disposed record clamping fingers pivotally mounted within said head, an axially disposed control rod extending through said housing and head, an actuating disk secured to the end of said rod operably connected with said fingers, and means for actuating said control rod in one direction to permit projection of said head into said record centering position under tension of said spring and camming movement of said fingers therewith into record clamping position, and in the opposite direction to swing said clamping members out of record engagement and retract said head against the tension of said spring into said housing and out of record centering position.

(References on following page)

References Cited in the file of this patent

UNITED STATES PATENTS

| | | |
|---|---|---|
| 1,289,584 | Weser | Dec. 31, 1918 |
| 1,347,096 | Heck | July 20, 1920 |
| 1,940,460 | Mitchell | Dec. 19, 1933 |
| 1,991,964 | Small | Feb. 19, 1935 |
| 2,068,449 | Downs | Jan. 19, 1937 |
| 2,159,836 | Alm | May 23, 1939 |
| 2,251,026 | Andres | July 29, 1941 |
| 2,320,877 | Manson et al. | June 1, 1943 |
| 2,323,365 | Andrews | July 6, 1943 |
| 2,531,374 | Andrews | Nov. 21, 1950 |
| 2,666,649 | Vanderzee et al. | Jan. 19, 1954 |

FOREIGN PATENTS

| | | |
|---|---|---|
| 632,233 | Great Britain | Nov. 18, 1949 |
| 664,532 | Great Britain | Jan. 9, 1952 |